US012530321B1

(12) United States Patent
Shilane et al.

(10) Patent No.: US 12,530,321 B1
(45) Date of Patent: Jan. 20, 2026

(54) CONSISTENTLY GROUPING AND ROUTING DATA SEGMENTS FOR DEDUPLICATION

(71) Applicant: EMC IP Holding Company LLC, Hopkinton, MA (US)

(72) Inventors: Philip Shilane, Newtown, PA (US); George Mathew, Belmont, CA (US); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 17/345,772

(22) Filed: Jun. 11, 2021

(51) Int. Cl.
*G06F 16/174* (2019.01)
*G06F 16/14* (2019.01)
*G06F 16/17* (2019.01)

(52) U.S. Cl.
CPC ........ *G06F 16/1748* (2019.01); *G06F 16/152* (2019.01); *G06F 16/1724* (2019.01)

(58) Field of Classification Search
CPC . G06F 16/1748; G06F 16/1724; G06F 16/152
See application file for complete search history.

(56) References Cited

U.S. PATENT DOCUMENTS 9,916,090 B1 * 3/2018 Can ....................... G06F 3/0649
2017/0017407 A1 * 1/2017 Wei ......................... G06F 16/00

OTHER PUBLICATIONS

Dong et al., "Tradeoffs in Scalable Data Routing for Deduplication Clusters," FAST '11: Proceedings on the 9th USENIX Conference on File and Storage Technologies, Feb. 2011, available: https://www.usenix.org/legacy/events/fast11/tech/full_papers/Dong.pdf.

* cited by examiner

*Primary Examiner* — Khanh B Pham
*Assistant Examiner* — Faezeh Forouharnejad
(74) *Attorney, Agent, or Firm* — Dergosits & Noah LLP; Todd A. Noah

(57) ABSTRACT

System receives data stream, groups sequential data segments associated with data stream until initial sequence of data segments is formed which is larger than minimum size. System groups sequential data segments which are next after initial sequence of data segments until next sequence of data segments is formed which combined with initial sequence of data segments is larger than maximum size. System determines feature value for each data segment in next sequence of data segments. System selects value from feature values, and data segment corresponding to selected value. System divides next sequence of data segments at selected data segment into part of initial group of data segments and part of next group of data segments. System combines part of initial group of data segments with initial sequence of data segments as initial group of data segments. System routes initial group of data segments or group of corresponding fingerprints for deduplication.

17 Claims, 7 Drawing Sheets

START
500
502 Receive stream of data
504 Group sequential data segments associated with stream of data until initial sequence of data segments is formed which has size that is larger than minimum size
506 Group sequential data segments which are next after initial sequence of data segments until next sequence of data segments is formed which combined with initial sequence of data segments have combined size that is larger than maximum size
508 Determine feature value for each data segment in next sequence of data segments
510 Select value from feature values, and data segment corresponding to selected value
512 Determine other feature value for at least one data segment in next sequence of data segments
514 Divide next sequence of data segments at selected data segment into part of initial group of data segments and part of next group of data segments
516 Combine part of initial group of data segments with initial sequence of data segments as initial group of data segments
518 Determine similarity group identifier based on one of at least one determined other feature value
520 Route initial group of data segments or group of corresponding fingerprints for deduplication
STOP

CONSISTENTLY GROUPING AND ROUTING DATA SEGMENTS FOR DEDUPLICATION

TECHNICAL FIELD

This disclosure relates to deduplication systems, and more particularly, to consistently grouping and routing data segments for deduplication.

BACKGROUND

Computer data storage systems include recording media that retain digital information, have evolved towards scalable designs that can grow with customer demand by adding storage and computation as necessary, and generally store redundant information. For example, when creating backup copies of an email system which includes 100 instances of the same 1 Megabyte (MB) file attachment, a computer data storage system stores all 100 instances of the same 1 MB file attachment, inefficiently using 100 MB of storage space to store the same 1 MB file attachment. Data deduplication can eliminate redundant copies of information, which can improve the utilization of computer data storage and lower capital expenditure by reducing the total amount of recording media required to meet the capacity needs of computer data storage. Continuing the previous example, a data deduplication system stores only one instance of the same 1 MB file attachment and stores small references to the one stored instance for the 99 subsequent instances.

When being written to a computer data storage system, a data file or a data object is divided into data segments. A data deduplication system can receive and then process the data segments by comparing these received data segments against previously stored data segments, identifying which received data segments are unique, and storing the unique data segments. When a comparison identifies a received data segment as a duplicate of a data segment that has already been stored as unique, a data deduplication system replaces the duplicate data segment with a small reference that points to the stored data segment.

Data deduplication efficiency depends on the number of duplications within data and how the data is divided for deduplication. For example, a relatively small data segment size enables a data deduplication system to identify more duplicates, and thereby save more recording media storage space. However, dividing a data file or a data object into a large number of small data segments increases the total size of the data segments' metadata because each data segment requites the same amounts of metadata, increases the deduplication time required to process large numbers of small data segments, and increases data fragmentation.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1A:
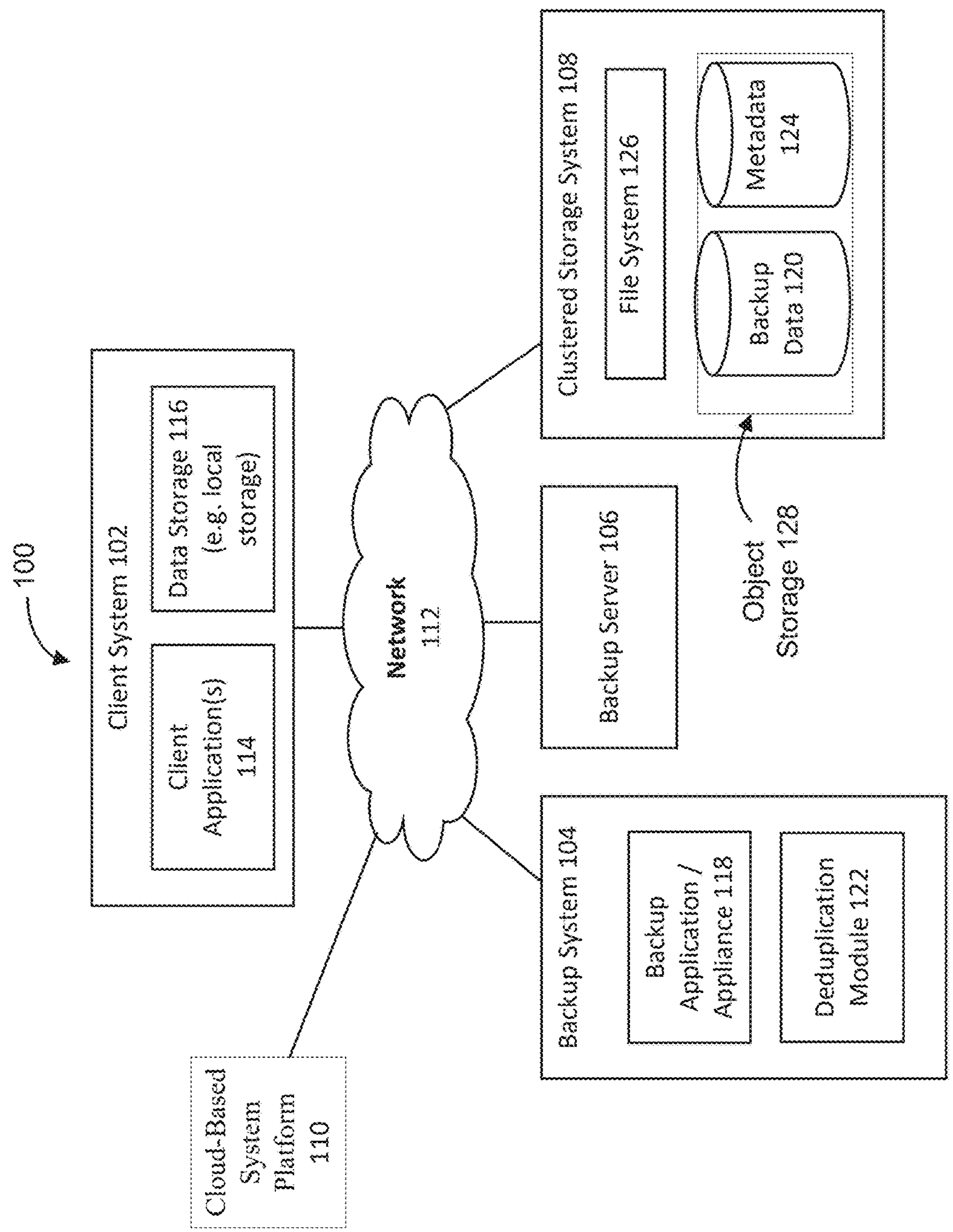
FIG. 1A is a block diagram illustrating an example operating environment for consistently grouping and routing data segments for deduplication, according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

In some embodiments, described is a system (and a computer program product and a method) for consistently grouping and routing data segments for deduplication. The system receives a stream of data, and groups sequential data segments associated with the stream of data until an initial sequence of data segments is formed which has a size that is larger than a minimum size. The system groups sequential data segments which are next after the initial sequence of data segments until a next sequence of data segments is formed which combined with the initial sequence of data segments have a combined size that is larger than a maximum size. The system determines a feature value for each data segment of the next sequence of data segments. The system selects a value from the feature values, and a data segment corresponding to the selected value.

The system can determine an additional feature value for at least one data segment of the next sequence of data segments. The system divides the next sequence of data segments at the selected data segment into a part of an initial group of data segments and a part of a next group of data segments. The system combines the part of the initial group of data segments with the initial sequence of data segments as the initial group of data segments. The system can determine a similarity group identifier based on one of the at least one additional feature value. The system routes the initial group of data segments or a group of corresponding fingerprints for deduplication, which can use the similarity group identifier for routing to an entity which has a range of similarity group identifiers that includes the determined similarity group identifier.

For example, a front-end microservice receives a stream of metadata for data segments in a client's incremental backup copy of a database. The front-end microservice groups the initial 250 data segments of the incremental backup copy as the initial sequence of data segments for forming the current L1 slice because the size of the initial 250 data segments is 2 MB, which is the minimum size of a group of data segments for forming a L1 slice. The front-end microservice groups the next 500 data segments which follow the initial 250 data segments in the incremental backup copy as the next sequence of data segments for forming the current L1 slice, because the size of the total grouped 750 data segments is 6 MB, which is the maximum size of a group of data segments for forming a L1 slice. The front-end microservice identifies feature values based on bytes 8 to 11 of the 20-byte SHA1 hash fingerprints which the client has already generated for these next 500 data segments.

The front-end microservice selects the maximal value of 4.289 billion from the values of the bytes 8-11 of the 20-byte SHA1 hash fingerprints for the data segments numbered 251 to 750, and then selects the data segment number 509 which has the maximal value 4.289 billion for the bytes 8-11 of its 20-byte SHA1 hash fingerprint. The front-end microservice optionally identifies the value of 2.147 billion for the bytes 4 to 7 of the 20-byte SHA1 hash fingerprint for the selected data segment number 509, so this identified value can be used as the basis for determining a similarity group identifier. The front-end microservice divides the next 500 data segments, which are numbered 251 to 750, at the data segment number 509, which results in the data segments numbered 251 to 509 being the ending part of the data segments for forming the current L1 slice and the data segments numbered 510 to 750 being the beginning part of the data segments for forming the next L1 slice.

The system combines the data segments numbered 251 to 509 which are the ending part of the data segments for forming the current L1 slice with the initial data segments numbered 1 to 250 to form the group of the data segments numbered 1 to 509 for forming the current L1 slice. The front-end microservice optionally identifies an unscaled value of 2.147483 billion for determining the similarity group identifier, based on the value of the bytes 4 to 7 of the 20-byte SHA1 hash fingerprint for the data segment number 509, and transforms the unscaled value to the scaled similarity group identifier of 483. The front-end microservice uses the similarity group identifier of 483 to route the fingerprints for the group of data segments numbered 1 to 509 as the current L1 slice to be deduplicated by the back-end microservice which supports L1 slices with similarity group identifiers in the range of 0 to 500.

In some embodiments, such a system may be provided within an operating environment. An example of such an operating environment is further described herein with reference to FIG. 1A. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments such as may be produced by data stream segmentation processes, data chunks, data blocks, atomic data, emails, data files, contacts, directories, subdirectories, volumes, etc. In some embodiments, the terms "data file" and "data object" may be used interchangeably. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or on virtual storage systems provided by a cloud service provider, etc.

Exemplary Environments

More specifically, and with reference to FIG. 1A, shown is a block diagram illustrating an example of an operating environment 100 for distributing phases of deduplication processing within a clustered storage environment according to one or more embodiments of the disclosure. As shown, the environment 100 may include a client system 102, a backup system 104, a backup server 106, a clustered storage system 108, and a cloud-based system platform 110, which may interact via a network 112, which may be any type of wired or wireless network including a local area network (LAN), a wide area network (WAN), or a direct communication link, or other suitable connection.

As shown, the operating environment 100 may include a client or client system (or computer, or device) 102 that may be associated with a client or customer of a data backup and protection service, and the backup system 104 that may be associated with a data backup and protection service provider. For example, the client system 102 may provide computing resources (such as databases, etc.) for users (such as website visitors) of the customer, data from which may be protected by the backup and data protection service provider. Accordingly, the client system 102 may act as a client from which backups are performed. In some embodiments, the client system 102 may comprise a virtual machine.

In addition, the client system 102 may host one or more client applications 114, and may include data storage 116, as well as an interface for communicating with other systems and devices, such as the backup system 104. In general, the client applications 114 may create new and/or modified data that is desired to be protected. As such, the client system 102 is an example of a host device. The data storage 116 may be used to store client data, which may, along with the client system 102 (such as the client applications 114), be backed up using the backup system 104.

As further described herein, components of the client system 102 (such as the client applications 114, the data storage 116, etc.) may be a data source, or be associated with, one or more data sources such as a database, a virtual machine, a storage device, etc. In addition, components of the client system 102 may be data sources that are associated with the client system 102, but these components may reside on separate servers such as a data server, or a cloud-computing infrastructure. The client system 102 may include a backup client application, or plug-in application, or API that cooperates with the backup system 104 to create backups of client data. The backed-up data can also be restored to the client system 102.

In one embodiment, the backup system 104 may represent one or more components of a Data Domain Restorer-based deduplication storage system, and a backup server 106 may be implemented in conjunction with a Data Domain deduplication storage server provided by Dell EMC for use with Data Domain Restorer storage devices. For example, the backup server 106 may be a stand-alone entity, or may be an element of the clustered storage system 108. In some embodiments, the backup server 106 may be a Dell EMC Avamar server or a Dell EMC Networker server, although no particular server is required, and other backup and storage system configurations are contemplated.

The backup system 104 may include a backup application (or appliance) 118 that performs (or manages, coordinates, etc.) the creation and restoration of data that may be backed-up. For example, data to be backed-up from the client system 102 may be communicated from the client system 102 to the backup application 118 for initial processing, after which the processed data is uploaded from the backup application 118 for storage at the clustered storage system, such as backup data 120. In some embodiments, the backup application 118 may cooperate with a backup client application of the client system 102 to back up client data to the clustered storage system 108. The backup application 118 may also cooperate with a backup client application to restore backup data from the clustered storage system 108 to the client system 102.

In some embodiments, the backup application 118 may be a part of, or work in conjunction with, a storage appliance. For example, the storage appliance may include a Dell EMC CloudBoost appliance, although any suitable appliance is contemplated. In addition, the backup application 118 may provide a variety of useful functionalities such as source-side data deduplication, data compression, and WAN optimization boost performance and throughput while also possibly reducing the consumption and cost of network bandwidth and cloud storage capacity.

One, some, or all, of these functions of the backup application 118 may be performed using deduplication logic via a deduplication module 122. For example, the deduplication module 122 can provide data segmentation, as well as in-flight encryption as the data is sent by the backup application 118 to the clustered storage system 108. However, as further described herein, in some embodiments, data deduplication may be performed entirely within the clustered storage environment 108. It should be noted that the backup application (or storage appliance) 118 may be implemented in various forms, such as a virtual, physical, or native public cloud appliance to fit the requirements of a particular configuration, and the backup application 118 may be used with various types of data protection environments, including public and private object storage clouds.

The clustered storage system 108, as further described herein, may store backup data 120 (backup files or backup objects) within a one or more nodes, as further described herein. As shown, the clustered storage system 108 may also store metadata 124 for (or associated with) the backup data 120, and one or more instances of a filesystem 126 that catalogs backup files and other data residing in the clustered environment. In general, the storage of the backup data 120 may be configured to store the client system 102's data backups that may be restored in the event of a loss of data. The clustered storage system 108 may be a file storage system or an object storage system that includes file storage 128 or object storage 128, as further described herein.

Figure 1B:
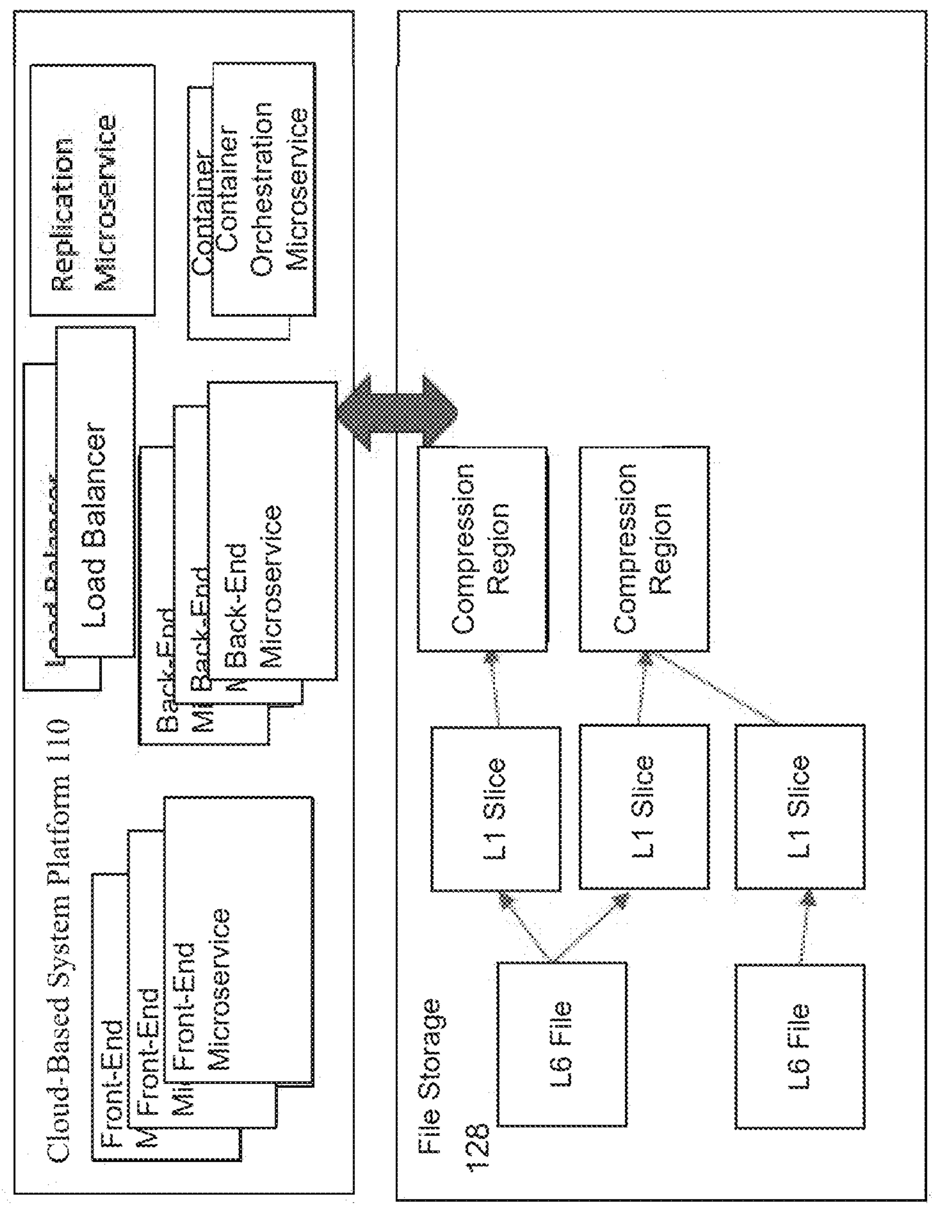
FIG. 1B is a block diagram illustrating parts of an example operating environment for consistently grouping and routing data segments for deduplication, according to one or more embodiments of the disclosure.

As shown in FIG. 1B, a cloud-based system platform 110 (such as, for example, a Kubernetes cloud computing environment) may provide for the deployment of various types of microservices. The cloud-based system platform 110 may allow for the deployment of microservices for consistently grouping and routing data segments for deduplication and for conditional storage in the file storage 128 or the object storage 128.

L6 Files or Objects, L1 Slices & L0 Compression Regions

In various embodiments, when a client writes a data object or data file to a microservice, the data object or data file may be divided into data segments. A deduplication system typically does not determine whether such a data segment is a duplicate data segment or a unique data segment by directly comparing this data segment against previously stored data segments which were previously determined to be unique data segments. For example, a deduplication system would waste system resources by directly comparing thousands of bytes in each of many data segments which were formed from a client's data object or data file against thousands of bytes in millions of data segments which have already been identified and stored as unique data segments. Instead, a fingerprint that uniquely identifies a data segment may be generated for each data segment, such as by applying a SHA1 hash function to create a unique 20-byte fingerprint for each data segment. Consequently, a deduplication system can conserve system resources by more efficiently comparing 20-byte fingerprints for each of many data segments formed from a client's data object or data file against 20-byte fingerprints for millions of data segments which have already been identified and stored as unique data segments.

If a client generates fingerprints for its data segments, the client can communicate these fingerprints, instead of its data segments, to a front-end microservice for a deduplication system. However, if a client does not generate fingerprints for its data segments, the client communicates the data segments to a front-end microservice. If a front-end microservice receives fingerprints for data segments from a client, the front-end microservice communicates these fingerprints to a back-end microservice for deduplication. However, if a front-end microservice receives data segments instead of their fingerprints from a client, the front-end microservice may communicate the data segments to a back-end microservice for deduplication, or the front-end microservice may generate the fingerprints for the data segments, and then communicate these fingerprints to the back-end microservice for deduplication.

If a back-end service receives fingerprints for data segments, the back-end microservice uses the fingerprints for deduplication of the data segments. However, if a back-end service receives data segments instead of their fingerprints, the back-end microservice generates the fingerprints for the data segments and then uses the fingerprints for deduplication of the data segments. An advantage of a client or a front-end microservice generating fingerprints for data segments, such that a back-end microservice does not have to generate these fingerprints, is a significant reduction in communication volume and time. For example, if a client or a front-end microservice generates a 20-byte SHA1 hash fingerprint for a typical 8,000-byte data segment, the amount of bytes that the client or the front-end microservice has to communicate for the content of this typical data segment is reduced by 99.75%, from 8,000 bytes to 20 bytes.

Whether a back-end microservice receives fingerprints for data segments or generates the fingerprints for the received data segments, the back-end microservice compares these new fingerprints against previously generated fingerprints for previously stored data segments that were previously identified as unique. These comparisons determine which of the new fingerprints are unique, and therefore were generated for data segments which are unique, and which of the new fingerprints are duplicates, and therefore were generated for data segments which are duplicates. Upon the identification of unique fingerprints generated for the data segments that are unique, the back-end microservice can communicate this identification of unique data segments to a front-end microservice, which can communicate this identification to a client. Then the unique data segments may be stored in a compressed format in a compression region by a client, a front-end microservice, or a back-end microservice, whichever entity currently retains the data segments which were just identified as unique segments.

Figure 2:
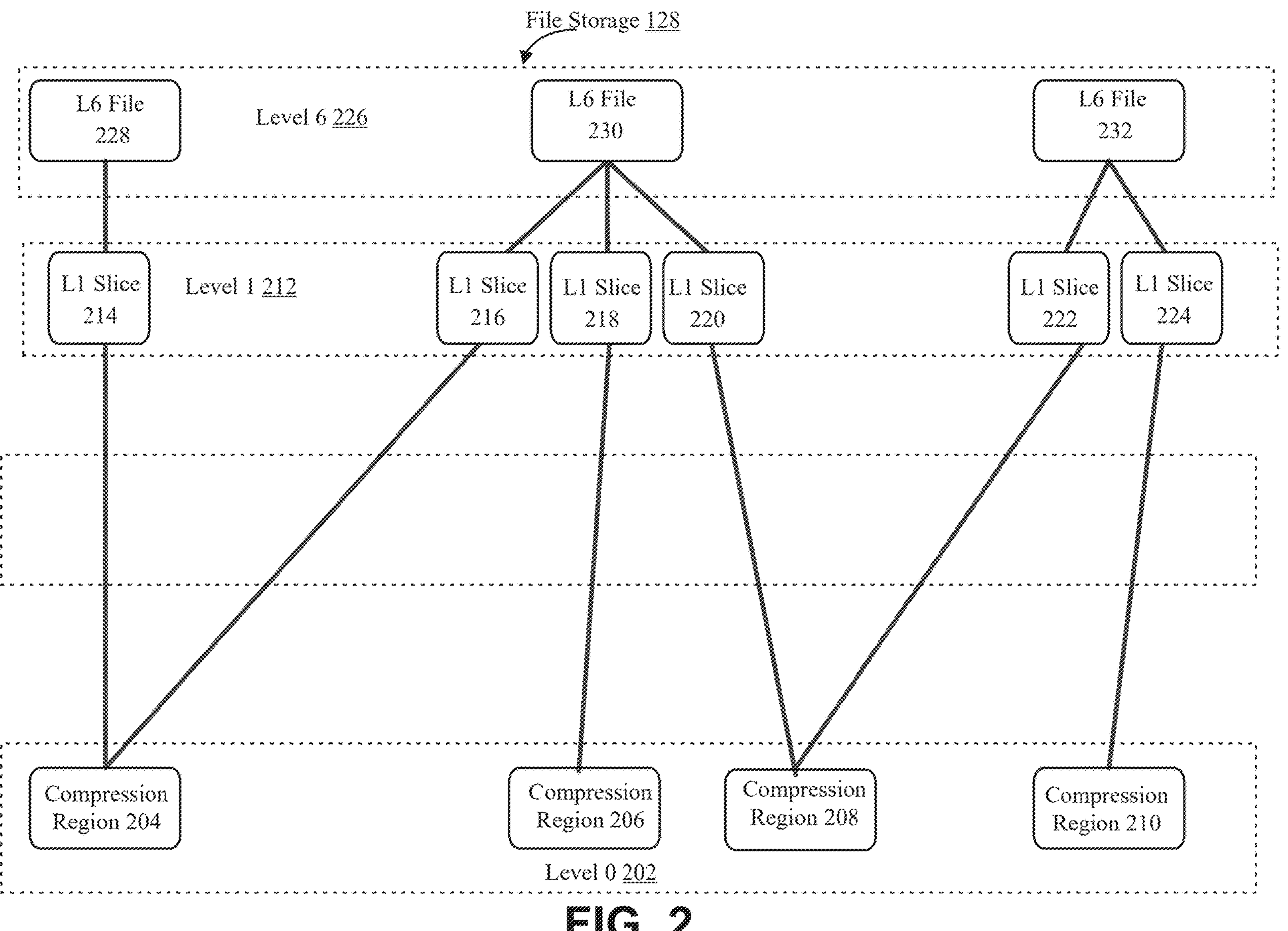
FIG. 2 is a block diagram illustrating relationships between L6 files or objects, L1 slices, and L0 compression regions for consistently grouping and routing data segments for deduplication, according to one or more embodiments of the disclosure.

FIG. 2 depicts that a portion of the file storage 128 or the object storage 128 may be represented by Level 0 202, which may include compression regions 202-210. Each compression region may store unique data segments that have been compressed and each compressed data segment's corresponding unique fingerprint and data segment size.

A data file or data object may be represented by a Merkle tree with the bottom level of the Merkle tree representing the data segments, which may be referred to as level 0 data segments or L0 data segments. Large numbers of sequential fingerprints, such as 20-byte SHA1 hash fingerprints, generated for sequential data segments, may be grouped together at the next higher level of the Merkle tree to form groups of fingerprints for data segments, which may be referred to as a level 1 data slice or a L1 slice. The fingerprints of the groups of data segments that form L1 slices may be grouped together as a level 2 fingerprints for data segment or a L2 data segment, and this process of grouping fingerprints for increasingly larger groups of data segments may continue up to level 6 or L6, which represents the entire data file or data object.

The top of a Merkle tree is referred to as an L6 data segment, even though it may actually refer to fingerprints for groups of data segments in a lower numbered level. Fingerprints for data segments which are above L0 may be referred to as LP data segments. While multiple L0 data segments may be compressed into 64-kilobyte (KB) to 128 KB sized compression regions, LP data segments are not compressed because fingerprints, such as 20-byte SHA1 hash fingerprints, are quite random and do not compress well.

Feature values may be determined for sequences of data segments, and these feature values may be used as the basis for forming a L1 slice and/or determining a similarity group identifier. A similarity group identifier may be used to route a L1 slice to a back-end node that is uniquely responsible for each L1 slice which has a similarity group identifier that is within a range of similarity group identifiers.

FIG. 2 depicts that a portion of the file storage 128 or the object storage 128 may be represented by Level 1 212, which may include L1 slices 214-224. Each L1 slice may store metadata that identifies the data object or data file to which a particular L1 slice belongs, a reference to a similarity group identifier, a reference to an underlying compression region, and a fingerprint array that stores those fingerprints included in a L1 slice and the sizes of each data segment represented by each fingerprint. FIG. 2 depicts that a portion of the file storage 128 or the object storage 128 may be represented by Level 6 226, which may include L6 files or objects 228-232. Each data object or data file has a corresponding L6 file or object, which may reference the one or more L1 slices associated with the data object or data file, since the associated L1 slices are based on an array of fingerprints of the data segments which comprise the data object or data file.

Deduplication happens when different data files or data objects refer to the same L0 and LP data segments. For example, if two data files are exactly the same, they would have the same L6 fingerprints. However, if two data files only partially overlap in their data, then some branches of the Merkle tree will be identical, with the same LP fingerprints and the same L0 data segments, while other branches of the Merkle tree will be different, with different LP fingerprints and different L0 data segments.

For a system with a single back-end node, a L1 slice may be formed based on fixed offsets within data objects or data files, regardless of data segment boundaries. Since L1 slices are all processed within a single back-end node, such a formation may have little impact on overall deduplication ratios, despite the partial data segments which may occur at the ends and the beginnings of the groups of data segments that form L1 slices. For a system with multiple back-end nodes, a L1 slice may be formed by evaluating a feature value (such as a hash of the first 64 bytes) of each data segment for forming the L1 slice until the feature value of one of the data segments satisfies criteria for forming a group of data segments, such as by the first data segment which has a feature value that matches a bit pattern mask. For example, a data segment which has the feature value that matches the bit pattern mask will serve as a boundary between where the data segments end for forming the current L1 slice and the data segments begin for forming the next L1 slice, which typically results in the L1 slices storing fingerprints for groups of data segments that range from 0.5 MB to 2.0 MB.

Then a feature value for a data segment for forming a L1 slice (such as a hash of the first 64 bytes of the first data segment for forming a L1 slice) may be used as the basis for determining a similarity group identifier to route the L1 slice to the appropriate back-end microservice. Using a hash of a representative portion of a data segment can result in L1 slices for data that are similar, but not identical, being routed to the same back-end microservice. The net effect of such routing may be to improve deduplication while increasing skew. Using a feature value for the first data segment for forming a L1 slice has the advantage that it is not necessary to buffer all data segments for forming a group of data segments that form a L1 slice before deciding where to route the L1 slice, something that matters when hundreds or thousands of data segments are being processed simultaneously. Collisions are acceptable when using a hash function for routing L1 slices rather than using a hash function for deduplication, so a system can base a similarity group identifier on the first 32-bit word of a 20-byte SHA-1 hash for the first 64 bytes in the first data segment in a group of data segments that form a L1 slice.

Figure 3:
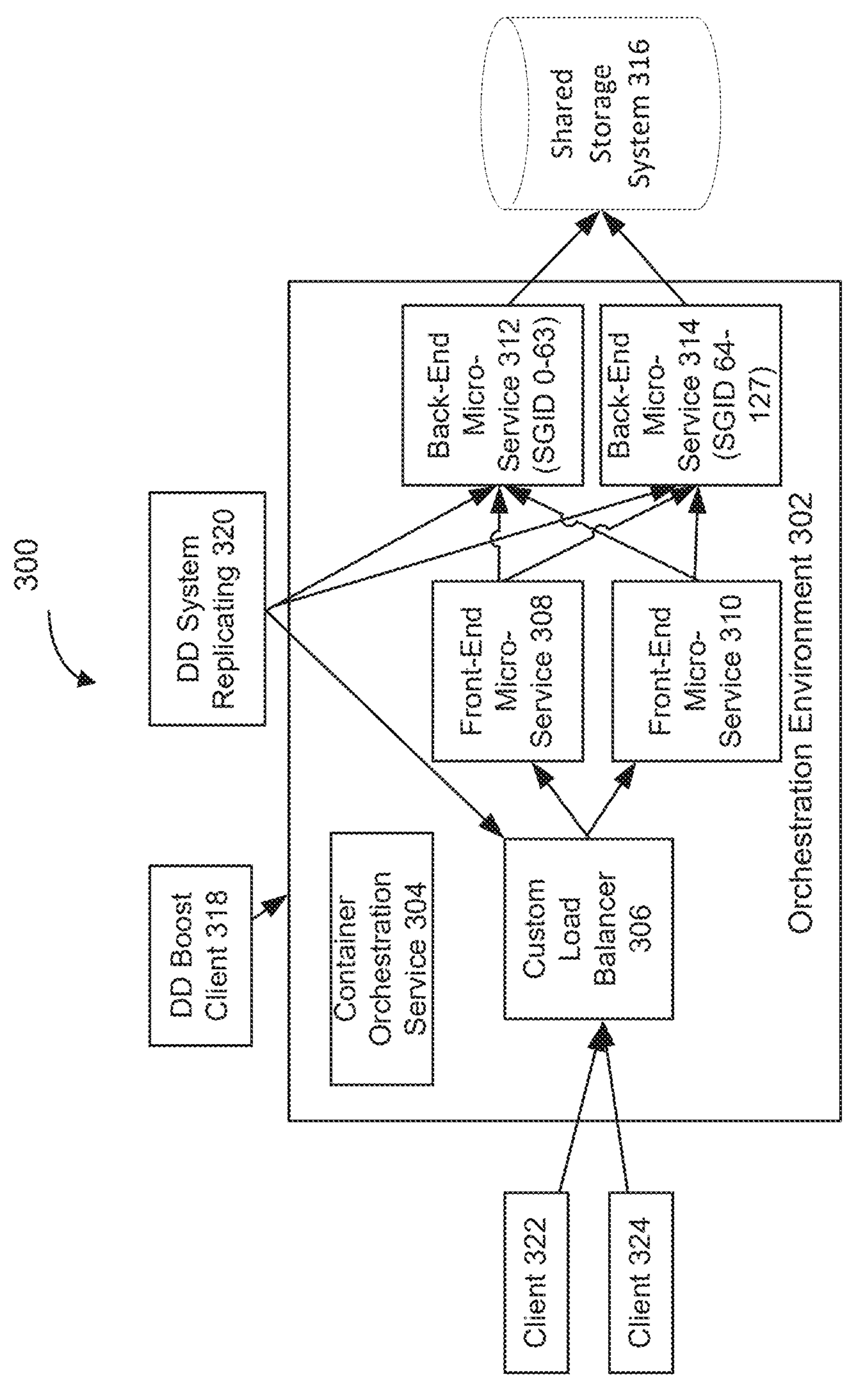
FIG. 3 is a block diagram illustrating a system for consistently grouping and routing data segments for deduplication, according to one or more embodiments of the disclosure.

A simplified diagram of the architecture for the system 300 is depicted in FIG. 3. An orchestration environment 302 may include a container orchestration service 304, such as Kubernetes, which may execute microservices inside the orchestration environment 302 as containers. The container orchestration service 304 can execute on one or multiple physical or virtual nodes, either on premises with dedicated hardware or in a public cloud environment. The orchestration environment 302 may include a custom load balancer microservice 306, front-end microservices 308 and 310, and back-end microservices 312 and 314. Although FIG. 3 depicts the orchestration environment 302 with one custom load balancer microservice 306, two front-end microservices 308 and 310, and two back-end microservices 312 and 314, the orchestration environment 302 may include any number of custom load balancer microservices 306, any number of the front-end microservices 308 and 310, and any number of the back-end microservices 312 and 314.

After deduplicating data segments, the back-end microservices 312 and 314 data may store the unique data segments in a shared storage system 316, which may be a private or public object storage system or other highly-available shared storage system that can scale to the needed size and provide data access even if there are underlying hardware failures. FIG. 3 also depicts a Data Domain system replicating 318 into a cluster with communication paths to the custom load balancer microservice 306 and multiple back-end microservices 312 and 314. Similarly, FIG. 3 also depicts that a Data Domain Boost client 318 would have the same communication paths, though the arrows illustrating the communication paths have been simplified.

For the traditional write path, when a client 322 or 324 writes a data file or data object into the orchestration environment 302, the communication first accesses the custom load balancer 306 that will route the data file or data object to the front-end microservice 308 or 310. The custom load balancer 306 routes the data file or data object based on a file handle or other information in a consistent manner so that future writes and/or reads of the same data file or data object will be routed consistently to the same front-end microservice 308 or 310. This consistent routing by the custom load balancer 306 enables the front-end microservices 308 and 310 to cache state in memory that may be reused for recesses and avoids expensive locking. The front-end microservices 308 and 310 are responsible for the namespace and for the upper levels, L2 to L6, of the Merkle tree.

The front-end microservice 308 or 310 can divide a data object or data file into data segments, which typically average 8 KB in size. Consecutive data segments which have fingerprints that form a L1 slice, may be megabytes in size depending on system properties, but an important detail is that a L1 slice is of a variable size and aligns with a data segment boundary. Feature values may be determined for the data segments, and then can be used as the basis for forming a L1 slice and determining a similarity group identifier, so that the L1 slice is routed to a back-end microservice 312 or 314 which is uniquely responsible for L1 slices that have a similarity group identifier that is in the range of similarity group identifiers for the back-end microservices 312 or 314.

As depicted in FIG. 3, if a similarity group identifier of 25 is determined for a L1 slice, then the L1 slice is routed to the back-end microservice 312, which processes L1 slices that have similarity group identifiers in the range of 0 to 63. In another example, if a similarity group identifier of 64 is determined for a L1 slice, then the L1 slice is routed to the back-end microservice 314, which processes L1 slices that have similarity group identifiers in the range of 64 to 127. Consistent routing enables the back-end microservices 312 and 314 to cache state to accelerate the deduplication process and avoid locking. The back-end microservices 312 and 314 are responsible for evaluating L1 slices, deduplicating L0 data segments, and communicating L1 slices' fingerprints back to the front-end microservices 308 and 310, so that L2 data segments may be formed.

The back-end microservices 312 and 314 perform the deduplication process of checking the current data segments' fingerprints against an index or cache of previous data segments' fingerprints which were previously identified as unique fingerprints, and determining which of the current fingerprints are unique, and therefore which of the current data segments are unique. Unique data segments are compressed together into a compression region, packed into a container or large object, and stored to the underlying shared storage system 316.

In Data Domain, metadata for a data segment may referred to as a seg_ref, and includes the data segment's 20-byte SHA1 hash fingerprint, the data segment's 4-byte XOR (exclusive or) value, the data segment's size, and a few other bytes. When a Data Domain Boost client traditionally writes data into a Data Domain system, the Data Domain Boost client forms data segments, generates the seg_refs, and sends the seg_refs to the Data Domain system, which performs deduplication and responds by identifying the newly formed data segments which are unique. The Data Domain Boost client then creates compression regions, compresses the identified unique data segments in the compression regions, and sends the compression regions to the Data Domain system. Data Domain replication has similarities to the functioning of the Data Domain Boost client.

There are various Data Domain replication algorithms, but at the core, when writing data, the source Data Domain system sends the seg_refs for the data segments across a network and receives back the identifiers of the unique data segments to compress and transfer.

Achieving high levels of deduplication requires forming L1 slices, determining a similarity group identifier for each L1 slice, and routing each L1 slice to the appropriate back-end microservice 312 or 314 in a consistent manner. After a L1 slice is formed from a data object or data file, future data objects or data files should have the same L1 slice boundaries in areas that are unmodified in the data objects or data files so that duplicate data segments may be identified. Since deduplication of L1 slices may reduce metadata overheads, forming L1 slices consistently also supports L1 slice deduplication.

Figure 4:
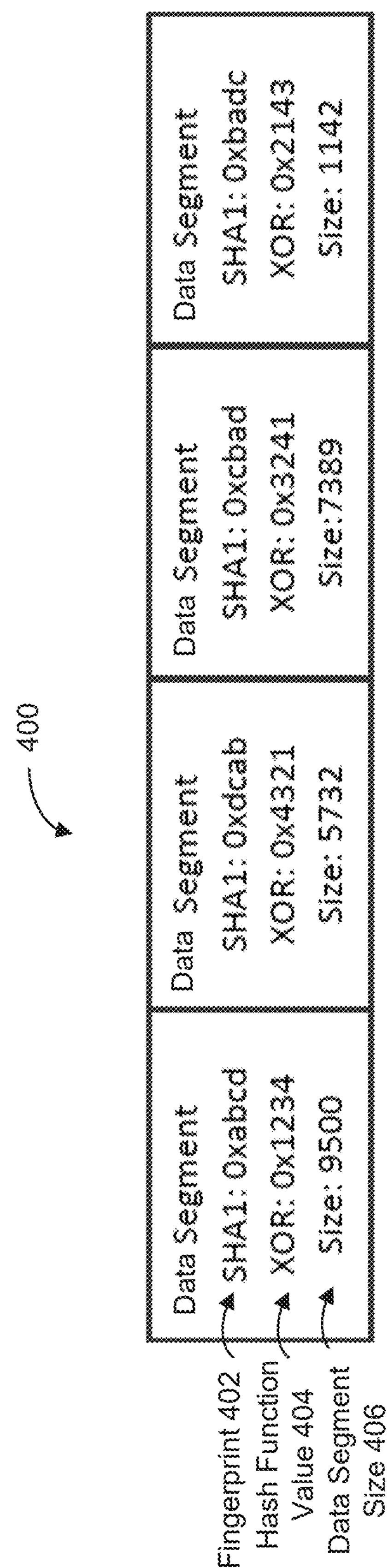
FIG. 4 is a block diagram illustrating metadata for a sequence of data segments for consistently grouping and routing data segments for deduplication, according to one or more embodiments of the disclosure.

For example, FIG. 4 depicts metadata 400 for a sequence of data segments which are a portion of a data file or data object that is being written to the orchestration environment 302. Each data segment is created in a content-defined manner with a data segment size that varies in a range, such as the range from 4 KB to 12 KB in Data Domain. Each data segment may be represented by metadata for a fingerprint 402, such as a 20-byte SHA1 hash fingerprint, a hash function value 404, such as a 4-byte XOR value over the data segment, and the data segment size 406. The data segment size 406 is the least computationally expensive field to generate, followed by the 4-byte XOR hash function value 404, whereas the 20-byte SHA1 hash fingerprint 402 is substantially more computationally expensive.

There are several guiding principles when forming a L1 slice and determining a similarity group identifier. L1 slices should be formed from the content of data objects or data files so that the formation is consistent for each data object or data file. L1 slices should store fingerprints for groups of data segments that have a minimum size and maximum size. A similarity group identifier should be determined for a L1 slice so that the determination is consistent for each L1 slice. The L1 slice formation and similarity group identifier determination should have low computational costs.

For Data Domain Boost, replication, and typical write paths, a front-end microservice 308 or 310 does not have to generate the fingerprints required for the data segments because the front-end microservice 308 or 310 already has access to client-generated fingerprints based on the 20-byte SHA1 hash of each data segment. A front-end microservice 308 or 310 can use a fingerprint which has already been generated for each data segment as the basis for forming L1 slices from fingerprints for groups of data segments and as the basis for determining a similarity group identifier for each L1 slice. A front-end microservice 308 or 310 can go from left to right in the array of data segments, skipping over data segments so that the minimum size of a group of data segments for forming a L1 slice is reached.

Then a front-end microservice 308 or 310 can determine a feature value for each subsequent data segment in the array. An example of a feature value is bytes 8-11 of a fingerprint of a data segment, which may have already been generated as a 20-byte SHA1 hash of the data segment. The range of the value of such a 4-byte feature value is 0 to 4,294 billion.

Using 20-byte SHA1 hashes to generate fingerprints for data segments is necessary to deduplicate the data segments based on their fingerprints, but such a generation of fingerprints is relatively expensive computationally. When a front-end microservice 308 or 310 receives data segments instead of the fingerprints for the data segments, the system 300 will achieve better parallelism if the front-end microservice 308 or 310 can quickly route groups of data segments to the back-end microservices 312 and 314. These back-end microservices 312 and 314 can generate the 20-byte SHA1 hash fingerprints in parallel instead of waiting for the front-end microservice 308 or 310 to generate the 20-byte SHA1 hash fingerprints for the groups of data segments. In such situations, a front-end microservice 308 or 310 can generate the 4-byte XOR value for each data segment, which is less computationally expensive than generating a 20-byte SHA1 hash fingerprint for each data segment. Then a front-end microservice 308 or 310 can use the 4-byte XOR value of the data segments as the feature value which is the basis for forming groups of data segments for L1 slices, and the basis for determining a similarity group identifier for each group of data segments formed for a L1 slice.

If the currently processed data segment's feature value is larger than any feature value previously determined for previous data segments in the array which are for forming the current L1 slice, a front-end microservice 308 or 310 retains that feature value as the maximal feature value for forming the current L1 slice. A front-end microservice 308 or 310 also retains information identifying the position in the array of the data segment corresponding to the maximal feature value for forming the current L1 slice. A front-end microservice 308 or 310 continues determining the feature values for data segments from left to right in the array of data segments which are for forming the current L1 slice until the total size of the data segments for forming the current L1 slice reaches the maximum size of a group of data segments for forming any L1 slice. A front-end microservice 308 or 310 uses the position of the data segment with the maximal feature value for forming the current L1 slice as the position that divides between the data segments for forming the current L1 slice and the data segments for forming the next L1 slice.

This example describes using the maximal value of the feature values that were determined for the specified subsection of data segments for forming the current L1 slice to identify the position of the data segment that divides data segments for forming the current L1 slice from the data segments for forming the next L1 slice. However, mathematical relationships other than the maximal value of these feature values may be used for forming the current L1 slice. For example, the minimal value of the feature values that were determined for the specified subsection of data segments for forming the current L1 slice may be used to identify the position of the data segment that divides the data segments for forming the current L1 slice from the data segments for forming the next L1 slice. Additional examples of the relationships to the feature values that may be used for forming the current L1 slice include the second highest value of the feature values, the second lowest value of the feature values, the third highest value of the feature values, and the third lowest value of the feature values, etc., for forming the current L1 slice.

The data segment that is identified as dividing the data segments for forming the current L1 slice from the data segments for forming the next L1 slice may be selected as either the ending data segment for forming the current L1 slice or as the beginning data segment for forming the next L1 slice. However, the same selection of the ending data segment for forming the current L1 slice or the beginning data segment must be used for forming the next L1 slice is consistently applied to the data segments in subsequent data objects or data files. Consequently, the boundaries of data segments for forming L1 slices are determined consistently for every data object or data file. If a user modifies data that is in only one data segment, and 1,000 data segment which average 8 KB in size are combined in a group of data segments that is 8 MB in size, the probability that the modified data segment is also the data segment with the maximal (or minimal) feature value for forming the current L1 slice is 1 divided by 1,000. Therefore, such a modification is highly unlikely to change the ending boundary for forming the L1 slice that includes the modified data segment and the beginning boundary for forming the subsequent L1 slice.

Therefore, a front-end microservice 308 or 310 can consistently form L1 slices by basing a feature value on a 20-byte SHA1 hash fingerprint or a 4-byte XOR value of each data segment in the specified subsection of data segments for forming the current L1 slice. Then a front-end microservice 308 or 310 can use the feature value to identify the data segment that is used to divide the group of data segments for forming the current L1 slice from the group of data segments for forming the subsequent L1 slice. Likewise, a front-end microservice 308 or 310 can consistently route L1 slices by basing an additional feature value on a 20-byte SHA1 hash fingerprint or a 4-byte XOR value of each data segment in the specified subsection of data segments for forming the current L1 slice. Then a front-end microservice 308 or 310 can use the additional feature as the basis to determine a similarity group identifier that is used to route the current L1 slice to the back-end microservice 312 or 314 which is uniquely responsible for L1 slices with the determined similarity group identifier.

For example, the maximal value of the bytes 8-11 from the fingerprints, which were generated by applying a 20-byte SHA1 hash to each data segment in the specified subsection of data segments for forming the current L1 slice, was used to select the data segment that divides the data segments for forming the current L1 slice from the data segments for forming the next L1 slice. Based on this example, a front-end microservice 308 or 310 can use the bytes 4-7 from the same 20-byte SHA1 hash fingerprint for the same selected data segment as the basis for determining a similarity group identifier for routing the current L1 slice. In an alternative example, the maximal value of the bytes 8-11 from the fingerprints, which were generated by applying a 20-byte SHA1 hash to each data segment in the specified subsection of data segments for forming the current L1 slice, was used to identify the data segment that divides the data segments for forming the current L1 slice from the data segments for forming the next L1 slice. Based on this alternative example, a front-end microservice 308 or 310 can use the second highest value of the bytes 8-11 from the same 20-byte SHA1 hash fingerprints as the basis for determining a similarity group identifier for routing the current L1 slice.

These examples describe using the maximal value and the second highest values of the 4 bytes from the fingerprints that were generated for each data segment in the specified subsection of data segments for forming the current L1 slice to determine a similarity group identifier for routing the current L1 slice for deduplication. However, mathematical relationships other than the maximal value or the second highest value of any part or all of each fingerprint may be used as an additional feature for determining the similarity group identifier for routing the current L1 slice for deduplication. For example, the minimal value of any part or all of each fingerprint that was generated for each data segment in the specified subsection of data segments for forming the current L1 slice may be used to determine a similarity group identifier for routing the current L1 slice. Additional examples of the mathematical relationships to any part or all of each fingerprint that may be used for routing the current L1 slice for deduplication include the second lowest value, the third highest value, or the third lowest value of any part or all of each fingerprint that was generated for each data segment in the specified subsection of data segments for forming the current L1 slice.

Since a similarity group identifier may be determined based on the values of 4 selected bytes, which form the alternative feature values, and which range from 0 to 4.294 billion, a front-end microservice 308 or 310 can transform the selected alternative feature value's range of values to fall in the range of zero up to the highest number of similarity groups supported, such as 1,000. For example, a front-end microservice 308 or 310 can apply a mod operator (such as the remainder after a value is divided by 1,000) to transform the selected alternative feature values to a similarity group identifier's value.

In another example, a front-end microservice 308 or 310 can use the maximal value of the 4-byte XOR value of each data segment in the specified subsection of data segments for forming the current L1 slice as the basis for determining a similarity group identifier for routing the current L1 slice. This example describes using the maximal value of a 4-byte XOR value of each data segment in the specified subsection of data segments for forming the current L1 slice as the basis for determining a similarity group identifier for routing the current L1 slice for deduplication. However, relationships other than the maximal value of a 4-byte XOR value of each data segment in the specified subsection of data segments for forming the current L1 slice may be used as the basis for determining a similarity group identifier for routing the current L1 slice for deduplication. For example, the minimal value of a 4-byte XOR value of each data segment in the specified subsection of data segments for forming the current L1 slice may be used as the basis for determining a similarity group identifier for routing the current L1 slice for deduplication. Additional examples of the relationships to a 4-byte XOR value of each data segment in the specified subsection of data segment for forming the current L1 slice that may be used include the second highest value, the second lowest value, the third highest value, or the third lowest value of any number of bits from each 4-byte XOR value of each data segment in the specified subsection of data segments for forming the current L1 slice.

However, directly using the maximal value of a 4-byte XOR value of each data segment in the specified subsection of data segments for forming the current L1 slice as a similarity group identifier for routing the current L1 slice for deduplication may have limited results because the maximal values may be squeezed into a smaller range of values than the full range of similarity group identifiers for routing the current L1 slice for deduplication. Therefore, a front-end microservice 308 or 310 can rehash the maximal value of the 4-byte XOR value of the data segment selected from the specified subsection of data segments for forming the current L1 slice to spread the maximal value out for routing the current L1 slice for deduplication over the range from 0 to 4,294 billion. Another alternative to creating a similarity group identifier for the data segment with the highest, second highest, lowest, or second lowest value of the 4-byte XOR values for forming the current L1 slice, a front-end microservice 308 or 310 could generate a more expensive hash over the selected data segment with the specified 4-byte XOR value for forming the current L1 slice. Such a hash could be a 20-byte SHA1 hash over the selected data segment for forming the current L1 slice or over a prefix of the selected data segment for forming the current L1 slice. Then a front-end microservice 308 or 310 could select a suitable number of consecutive bits from the 20-byte SHA1 hash of the selected data segment to use as the basis for determining the similarity group identifier for routing the current L1 slice for deduplication.

The reason to pursue this option is that 4-byte XOR hash function values have less randomness then 20-byte SHA1 hash function values. The advantage of being configured to use the 4-byte XOR hash function value is that the 4-byte XOR hash function value may already be available for Data Domain Boost and replication. However, if unavailable, the 4-byte XOR hash function value is much less computationally expensive to generate than a 20-byte SHA1 hash function value.

Therefore, a front-end microservice 308 or 310 can quickly generate the 4-byte XOR hash function values for each data segment in the specified subsection of data segments for forming the current LL1 slice if needed. Then a front-end microservice 308 or 310 can select the boundaries of the group of data segments for forming the current L1 slice and determine a similarity group identifier to route the current L1 slice to the back-end microservice 312 or 314 which is uniquely responsible for L1 slices with the determined similarity group identifier. Using 4-byte XOR hash function values to form and then route L1 slices reduces the computational requirements on the front-end microservices 308 and 310.

The system 300 is compatible with transfers from the Data Domain Boost client 318 as well as replication from the Data Domain system replicating 320, The Data Domain Boost client 318 can form data segments, generate the seg_refs, use the seg_refs to determine which groups of data segments form L1 slices, and determine the similarity group identifiers for the L1 slices on the client side. Then the Data Domain Boost client 318 can use the similarity group identifiers to route the L1 slices to the back-end microservices 312 and 314 which are responsible for processing L1 slices with the corresponding similarity group identifiers. Next, the responsible back-end microservices 312 and 314 perform deduplication, identify the unique data segments, and send the identification of the unique data segments to the Data Domain Boost client 318, which creates compression regions, compresses the identified unique data segments in the compression regions, and sends the compression regions to the responsible back-end microservices 312 and 314 for storage to the underlying shared storage system 316. Similarly, replication from a legacy Data Domain system is supported without new expensive computations. The Data Domain Boost system, or a module within the Data Domain Boost, can process replicated data from a Data Domain system to form L1 slices and then route the L1 slices to the back-end microservices 312 or 314 consistently with the main write path for the system 300.

Figure 5:
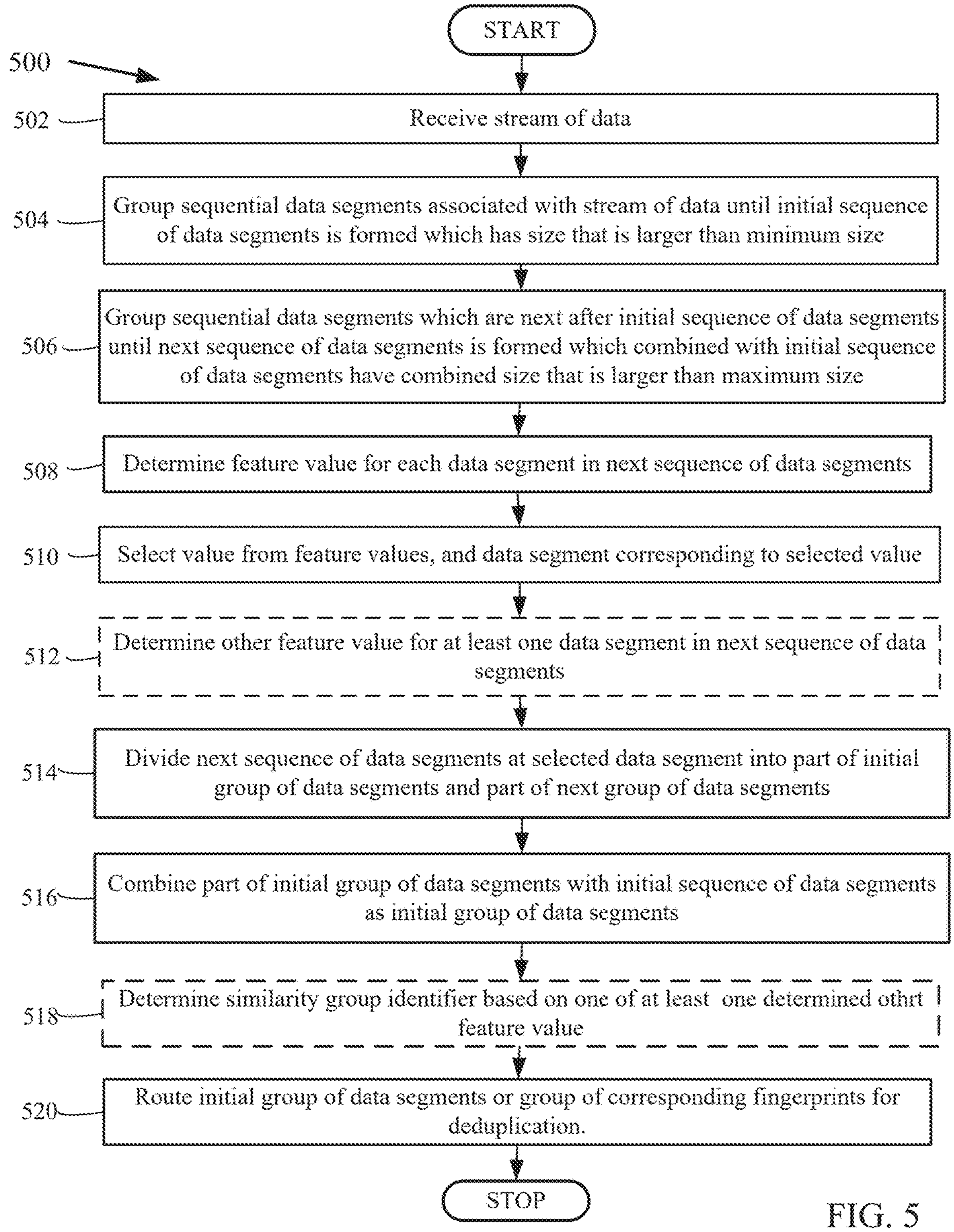
FIG. 5 is a block diagram illustrating an example method for consistently grouping and routing data segments for deduplication, according to one or more embodiments of the disclosure.

FIG. 5 is a flowchart that illustrates a method for consistently grouping and routing data segments for deduplication, under an embodiment. Flowchart 500 illustrates method acts illustrated as flowchart blocks for certain steps involved in the client system 102, the backup system 104, the backup server 106, the clustered storage system 108, and the cloud-based system platform 110 of FIG. 1.

A stream of data is received, block 502. The system receives a data file or data object's data segments and/or the data segment's metadata. For example, and without limitation, this can include the front-end microservice 308 receiving a stream of metadata for data segments in an incremental backup copy of a database from the client 322, with the metadata including the data segment's 20-byte SHA1 hash fingerprints, the data segment's 4-byte XOR values, and the data segment's sizes. In an alternative example, the front-end microservice 308 receives a stream of the data segments in an incremental backup copy of a database from the client 322. A stream of data can be a series of information elements made available over time.

During receipt of a stream of data, sequential data segments associated with the stream of data are grouped until an initial sequence of data segments is formed which has a size that is larger than a minimum size, block 504. The system ensures that the aggregated size of the data segments which have been identified for a data object or data file meets the minimum size of a group of data segments for forming a L1 slice. By way of example and without limitation, this can include the front-end microservice 308 grouping the initial 250 data segments of the incremental backup copy as the initial sequence of data segments for the current L1 slice because the size of the initial 250 data segments is 2 MB, which is the minimum size of a group of data segments for forming a L1 slice.

Sequential data segments can be consecutive portions of information in an object or file. Any sequence of data segments can be consecutive portions of information in an object or file. A size can be a storage space magnitude. A minimum size can be a smallest storage space magnitude for a specific purpose.

After identifying the initial sequence data segments, sequential data segments which are next after the initial sequence of data segments are grouped until a next sequence of data segments is formed which combined with the initial sequence of data segments have a combined size that is larger than a maximum size, block 506. The system groups a data file or object's data segments until the combined size of the grouped data segments is larger than the maximum size for a group of data segments for forming a L1 slice. In embodiments, this can include the front-end microservice 308 grouping the next 500 data segments which follow the initial 250 data segments in the incremental backup copy as the next sequence of 500 data segments for forming the current L1 slice, because the size of the total grouped 750 data segments is 6 MB, which is the maximum size for a group of data segments for forming a L1 slice. A combined size can be a collection of storage space magnitudes. A maximum size can be a largest storage space magnitude for a specific purpose.

While grouping consecutive data segments as the next sequence of data segments, a feature value is determined for each data segment of the next sequence of data segments, block 508. Determining the feature value for each data segment in the next sequence of data segments may be based on each result from applying a hash function to each data segment of the next sequence of data segments, and a series of bits may be selected from each result as each feature value. The system determines a feature value based on each data segment's 20-byte SHA1 hash fingerprint or a 4-byte XOR value.

For example, and without limitation, this can include the front-end microservice 308 identifying bytes 8 to 11 of the 20-byte SHA1 hash fingerprints which the client 322 has already generated for these next 500 data segments. In an alternative example, the front-end microservice 308 generates a 4-byte XOR value for each of the next 500 data segments because some clients are not expected to generate 20-byte SHA1 hash fingerprints for their data segments. In another alternative example, the front-end microservice 308 generates a 4-byte XOR value for each of the next 500 data segments because 20-byte SHA1 hash fingerprints have not already been generated for these next 500 data segments by any client.

A value can be a numerical amount. A feature value can be a numerical amount of an attribute of something. A result can be a consequence or outcome of something. A hash function can be an operation that maps data of arbitrary size to data of fixed size. A series of bits can be a sequence of binary digits.

Following the determination of a feature value for each data segment of the next sequence of data segments, a value is selected from the feature values, and a data segment is selected corresponding to the selected value, block 510. Selecting a value from the feature values may include identifying a mathematical relationship of the selected value to a maximal value or a minimal value of the feature values. The system identifies the data segment that will be used to divide the sequence of data segments which form the current L1 slice from the sequence of data segments which form the subsequent L1 slice, which may be based on the maximal or minimal value of specific bytes of the 20-byte SHA1 hash fingerprint or the 4-byte XOR value for the identified data segment. By way of example and without limitation, this can include the front-end microservice 308 selecting the maximal value of 4.289 billion from the bytes 8-11 of the 20-byte SHA1 hash fingerprints for the data segments numbered 251 to 750, and then selecting the data segment number 509 which has the maximal value 4.289 billion for the bytes 8-11 of its 20-byte SHA1 hash fingerprint. In an alternative example, the front-end microservice 308 selects the maximal value of 4.283 billion from the 4-byte XOR value for each of the data segments numbered 251 to 750, and then selects the data segment number 509 which has the maximal value 4.283 billion for the 4-byte XOR value.

A selected value can be a chosen numerical amount of an attribute of something. A mathematical relationship can be how values are associated on a numerical basis. A maximal value can be the largest numerical amount of an attribute of some things within a specific range of things. A minimal value can be the smallest numerical amount of an attribute of some things within a specific range of things. A feature value can be a specified numerical amount of an attribute of something.

During the grouping of consecutive data segments as the next sequence of data segments, or after the selecting of a value from the feature values and a data segment corresponding to the selected value, an additional feature value is optionally determined for at least one data segment in the next sequence of data segments, block 512. Determining the additional feature value for at least one data segment of the next sequence of data segments may be based on identifying a result from applying a hash function to the selected data segment and selecting a series of bits from the result, wherein the selected series of bits is mutually exclusive of any series of bits selected for the feature values. Alternatively, determining the additional feature value for at least one data segment in the next sequence of data segments may be based on each result from applying a hash function to each data segment of the next sequence of data segments, and then selecting a series of bits from each result as each additional feature value. The system can determine another feature value for at least one data segment, and the other feature value may be based on the value of specific bytes for at least one fingerprint of at least one data segment in the specified subsection of data segments for forming the current L1 slice. For example, and without limitation, this can include the front-end microservice 308 identifying the value of 2.147483 billion for the bytes 4 to 7 of the 20-byte SHA1 hash fingerprint for the selected data segment number 509.

In an alternative example, the front-end microservice 308 identifies the value of 4.283 billion as the second highest value of bytes 8 to 11 of the 20-byte SHA1 hash fingerprints for these next 500 data segments, so that the second highest value of 4.283 billion may be used as the basis for determining a similarity group identifier. In another alternative example, the front-end microservice 308 identifies the value of 4.283 billion as the second highest value of the 4-byte XOR value for these next 500 data segments, so that the second highest value of 4.283 billion may be used as the basis for determining a similarity group identifier. An additional feature value can be an alternative numerical amount of an attribute of something.

Having selected a data segment, the next sequence of data segments is divided at the selected data segment, which includes divisions into a part of an initial group of data segments and a part of a next group of data segments, block 514. The system divides the data segments for forming the current L1 slice from the data segments for forming the subsequent L1 slice at the data segment which has the maximal (or minimal) value of specific bytes of its 20-byte SHA1 hash fingerprint or its 4-byte XOR value. For example, and without limitation, this can include the front-end microservice 308 dividing the next 500 data segments, which are numbered 251 to 750, at the data segment number 509, which results in the data segments numbered 251 to 509 being the ending part of the current L1 slice and the data segments numbered 510 to 750 being the beginning part of the data segments for forming the next L1 slice. A part can be a piece of something which combined with other pieces makes up the whole. Any group of data segments can be a collection of consecutive portions of information in an object or file.

After dividing the next sequence of data segments to form a part of the initial group of data segments, the part of the initial group of data segments is combined with the initial sequence of data segments as the initial group of data segments, block 516. The system combines the ending and beginning parts of the initial group of data segments. By way of example and without limitation, this can include the front-end microservice 308 combining the data segments numbered 1 to 250 with the data segments numbered 251 to 509, which results in the data segments numbered 1 to 509 being the data segments for forming the current L1 slice.

Following the determination of at least one additional feature value, a similarity group identifier is optionally determined based on one of the at least one additional feature value, which may include identifying a mathematical relationship of the one of the at least one additional feature values to a maximal value or a minimal value of the at least one additional feature value, block 518. The system can determine a similarity group identifier for routing the current L1 slice or its data segments to a back-end microservice for deduplication, and the similarity group identifier may be based on the maximal (or minimal) value of specific bytes of each 20-byte SHA1 hash fingerprint or 4-byte XOR value for each data segment in the specified subsection of data segments for forming the current L1 slice. In embodiments, this can include the front-end microservice 308 determining an unscaled similarity group identifier of 2.147483 billion for the bytes 4 to 7 of the SHA1 hash fingerprint for the selected data segment number 509. In an alternative example, the front-end microservice 308 determines an unscaled similarity group identifier of 4.283 billion for the data segment number 505 because the data segment number 505 has the second highest value of the bytes 8 to 11 of each 20-byte SHA1 hash fingerprint for the data segments numbered 251 to 750. In another alternative example, the front-end microservice 308 determines an unscaled similarity group identifier of 4.283 billion for the data segment number 507 because the data segment number 507 has the highest value of any 4-byte XOR value for the data segments numbered 251 to 750.

The front-end microservice 308 can apply a mod operator to transform the selected alternative feature value to a similarity group identifier's value, such as the remainder of 483 after 2.147483 billion is divided by 1,000. A similarity group identifier can be a number which refers to how much a sequence of data segments resembles other sequences of data segments. An additional feature value can be a specified alternative numerical amount of an attribute of something.

After dividing the next sequence of data segments to form an initial group of data segments, the initial group of data segments or a group of corresponding fingerprints is routed for deduplication, block 520. Routing the initial group of data segments or the initial group of the data segments' fingerprints for deduplication may be based on using the determined similarity group identifier to route the initial group of data segments or the initial group of the data segments' fingerprints to an entity which is associated with a range of similarity group identifiers that include the determined similarity group identifier. The system routes the current L1 slice or its corresponding data segments for deduplication, which may be routed to a back-end microservice which is responsible for a range of similarity group identifiers that include the similarity group identifier for the current L1 slice or its corresponding data segments. For example, and without limitation, this can include the front-end microservice 308 using the similarity group identifier of 483 to route the fingerprints for the initial group of data segments numbered 1 to 509 as the current L1 slice to be deduplicated by the back-end microservice 312, which supports L1 slices with similarity group identifiers in the range of 0 to 500. In an alternative example, the front-end microservice 308 uses the similarity group identifier of 483 to route the initial group of data segments numbered 1 to 509, for the current L1 slice, to be deduplicated by the back-end microservice 312, which supports L1 slices with similarity group identifiers in the range of 0 to 500.

Deduplication can be the elimination of redundant information. A similarity group identifier can be a specified number which refers to how much a group of data segments resembles other groups of data segments. A range of similarity group identifiers can be a variation in numbers which refer to how much groups of data segments resemble other groups of data segments. An entity can be a service and/or an electronic component. A fingerprint can be a bit string which was mapped from a larger data object or data file, and which uniquely identifies the larger data object or data file.

Although FIG. 5 depicts the blocks 502-520 occurring in a specific order, the blocks 502-520 may occur in other orders. In other implementations, each of the blocks 502-520 may also be executed concurrently and/or in combination with other blocks and/or some blocks may be divided into a different set of blocks.

Exemplary Computing System

Figure 6:
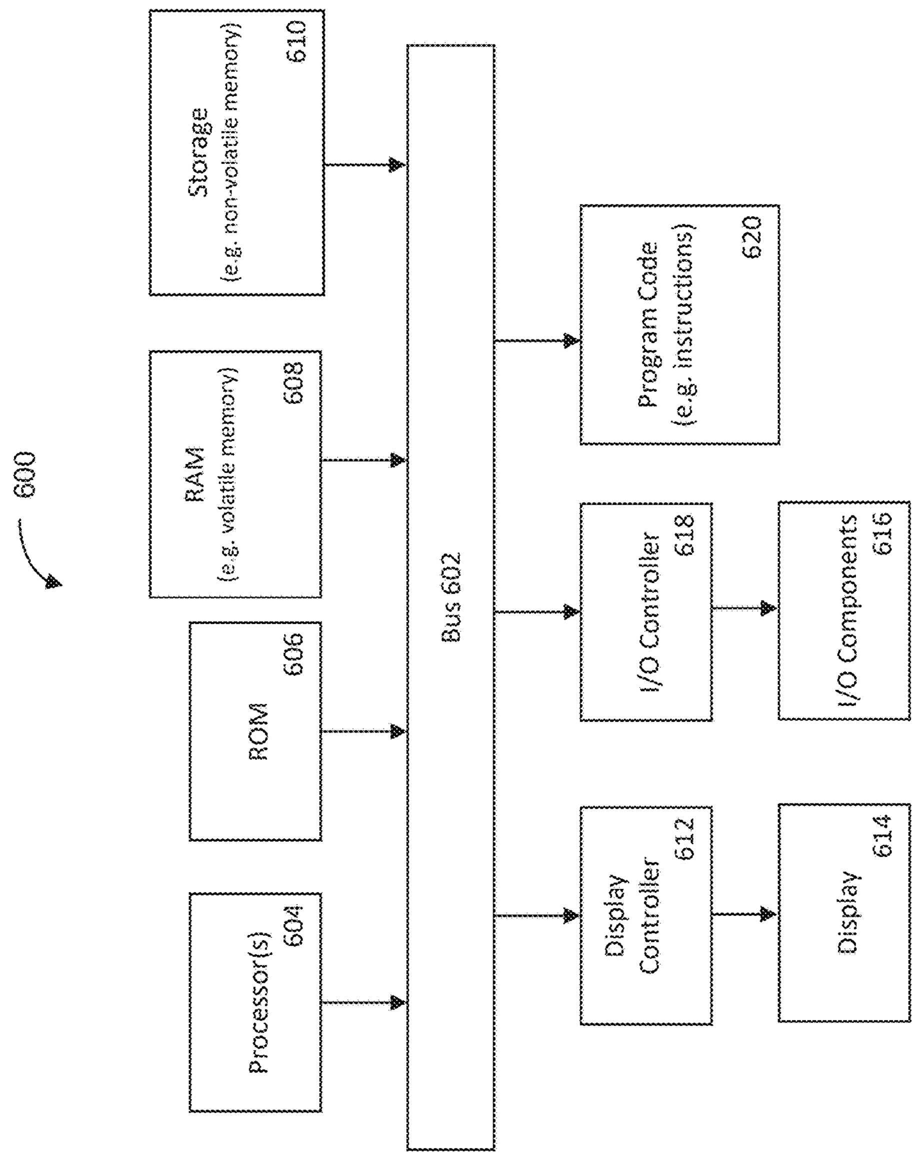
FIG. 6 is a block diagram illustrating a computing system for consistently grouping and routing data segments for deduplication, according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the system. It should be appreciated that storage 610 may be remote from the system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as “first,” “second,” “third,” etc., may indicate an adjective for an element (such as any noun in the application). The use of ordinal numbers does not necessarily imply or create any particular ordering of the elements nor limit any element to being only a single element unless expressly disclosed, such as by the use of the terms “before,” “after,” “single,” and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term “or” indicates an inclusive or (such as “and/or”) unless otherwise specified. For example, the phrase “at least one of x, y, or z” means any one of x, y, and z, as well as any combination thereof. In addition, the term “based on” is used to describe one or more factors that affect a determination.

These terms do not foreclose additional factors that may affect a determination. For example, the phrase “determining A based on B” includes B being a factor that affects the determination of A, and does not foreclose the determination of A from also being based on C. However, in other instances, A may be determined based solely on B, such as by the use of the terms “only,” “solely,” and other such terminology. In addition, the term “approximately” or “substantially” may be used herein and may be interpreted as “as nearly as practicable,” “within technical limitations,” and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for consistently grouping and routing data segments for deduplication, comprising:

one or more processors; and a non-transitory computer readable medium storing a plurality of instructions, which when executed, cause the one or more processors to:

create a beginning part of an initial sequence of data segments by consecutively grouping sequential data segments from a stream of data until a size of the sequential data segments being grouped is larger than a minimum size, in response to receiving the stream of data;

create a next sequence of data segments by consecutively grouping sequential data segments which are next in the stream of data after the beginning part of the initial sequence of data segments until an aggregate of a size of the sequential data segments, after the beginning part of the initial sequence of data segments, being grouped and the size of the beginning part of the initial sequence of data segments is larger than a maximum size, the next sequence of data segments being distinct from the beginning part of the initial sequence of data segments determine a feature value for each data segment in the next sequence of data segments;

select a value from the feature values, and a data segment corresponding to the selected value from the next sequence of data segments;

determine an additional feature value for at least one data segment in the next sequence of data segments;

divide the next sequence of data segments at the selected data segment into an ending part of the initial group sequence of data segments and a beginning part of the next group sequence of data segments;

combine the beginning part of the initial group sequence of data segments with the ending part of the initial sequence of data segments from the next sequence of data segments in the stream of data being routed for deduplication, the combination forming an initial group of data segments;

determine a similarity group identifier based on one of the at least one additional feature values, route, based on the similarity group identifier, one of the initial group of data segments or a group of corresponding fingerprints for deduplication to one of a plurality of deduplication modules that are each uniquely responsible for corresponding groups of data segments associated with a range of similarity group identifiers including the determined similarity group identifier; and deduplicate, by the one of the plurality of deduplication modules, one of the group of fingerprints or the corresponding initial group of data segments being similar to, but not identical to, the groups of data segments associated with the one of the plurality of deduplication modules.

2. The system of claim 1, wherein determining the feature value for each data segment of the second sequence of data segments is based on each result from applying a hash function to each data segment of the second sequence of data segments.

3. The system of claim 2, wherein being based on each result from applying the hash function to each data segment of the second sequence of data segments comprises selecting a series of bits from each result as each feature value.

4. The system of claim 1, wherein selecting the value from the feature values comprises identifying a mathematical relationship of the selected value to one of a maximal value and a minimal value of the feature values.

5. The system of claim 1, wherein determining the additional feature value for the at least one data segment of the second sequence of data segments is based on identifying a result from applying a hash function to the selected data segment and selecting a series of bits from the result, wherein the selected series of bits is mutually exclusive of any series of bits selected for any feature value.

6. The system of claim 1, wherein determining the additional feature value for the at least one data segment of the second sequence of data segments is based on each result from applying a hash function to each data segment of the second sequence of data segments, and selecting a series of bits from each result as each additional feature value, and wherein the similarity group identifier being based on one of the at least one additional feature value comprises identifying a mathematical relationship of the one of the at least one additional feature value to one of a maximal value and a minimal value of the at least one additional feature value.

7. A computer program product comprising a non-transitory computer-readable medium having a computer-readable program code embodied therein to be executed by one or more processors, the program code including instructions to:

create a first sequence of data segments by consecutively grouping sequential data segments from a stream of data until a size of the grouped sequential data segments is larger than a minimum size;

create a second sequence of data segments by consecutively grouping sequential data segments that immediately follow the first sequence of data segments in the data stream until an aggregate of a size of the grouped sequential data segments that immediately follow the first sequence of data segments and the size of the first sequence of data segments is larger than a maximum size, the second sequence of data segments being distinct from the first sequence of data segments;

determine a feature value for each data segment in the second sequence of data segments;

select a value from the feature values, and a data segment corresponding to the selected value from the second sequence of data segments;

determine an additional feature value for at least one data segment in the next sequence of data segments;

divide the next sequence of data segments at the selected data segment into an ending part of the initial group sequence of data segments and a beginning part of the next group sequence of data segments;

combine the beginning part of the initial group sequence of data segments with the ending part of the initial sequence of data segments from the next sequence of data segments in the stream of data being routed for deduplication, the combination forming an initial group of data segments;

determine a similarity group identifier based on one of the at least one additional feature values, route, based on the similarity group identifier, one of the initial group of data segments or a group of corresponding fingerprints for deduplication to one of a plurality of deduplication modules that are each uniquely responsible for corresponding groups of data segments associated with a range of similarity group identifiers including the determined similarity group identifier; and deduplicate, by the one of the plurality of deduplication modules, one of the group of fingerprints or the corresponding initial group of data segments being similar to, but not identical to, the groups of data segments associated with the one of the plurality of deduplication modules.

8. The computer program product of claim 7, wherein determining the feature value for each data segment of the second sequence of data segments is based on each result from applying a hash function to each data segment of the second sequence of data segments.

9. The computer program product of claim 8, wherein being based on each result from applying the function to each data segment of the second sequence of data segments comprises selecting a series of bits from each result as each feature value.

10. The computer program product of claim 7, wherein selecting the value from the feature values comprises identifying a mathematical relationship of the selected value to one of a maximal value and a minimal value of the feature values.

11. The computer program product of claim 7, wherein determining the additional feature value for the at least one data segment of the second sequence of data segments is based on identifying a result from applying a hash function to the selected data segment and selecting a series of bits from the result, wherein the selected series of bits is mutually exclusive of any series of bits selected for any feature value.

12. The computer program product of claim 7, wherein determining the additional feature value for the at least one data segment of the second sequence of data segments is based on each result from applying a hash function to each data segment of the second sequence of data segments, and selecting a series of bits from each result as each additional feature value, and wherein the similarity group identifier being based on one of the at least one additional feature value comprises identifying a mathematical relationship of the one of the at least one additional feature value to one of a maximal value and a minimal value of the at least one additional feature value.

13. A computer-implemented method for consistently grouping and routing data segments for deduplication, comprising:

creating a first sequence of data segments by consecutively grouping sequential data segments from a stream of data until a size of the grouped sequential data segments larger than a minimum size;

creating a second sequence of data segments by consecutively grouping sequential data segments that immediately follow the first sequence of data segments in the data stream until an aggregate of a size of the grouped sequential data segments that immediately follow the first sequence of data segments and the size of the first sequence of data segments is larger than a maximum size, the second sequence of data segments being distinct from the first sequence of data segments;

determining a feature value for each data segment in the second sequence of data segments;

selecting a value from the feature values, and a data segment corresponding to the selected value from the second sequence of data segments;

determining an additional feature value for at least one data segment in the next sequence of data segments;

dividing the next sequence of data segments at the selected data segment into an ending part of the initial group sequence of data segments and a beginning part of the next group sequence of data segments;

combining the beginning part of the initial group sequence of data segments with the ending part of the initial sequence of data segments from the next sequence of data segments in the stream of data being routed for deduplication, the combination forming an initial group of data segments;

determining a similarity group identifier based on one of the at least one additional feature values, routing, based on the similarity group identifier, one of the initial group of data segments or a group of corresponding fingerprints for deduplication to one of a plurality of deduplication modules that are each uniquely responsible for corresponding groups of data segments associated with a range of similarity group identifiers including the determined similarity group identifier; and deduplicating, by the one of the plurality of deduplication modules, one of the group of fingerprints or the corresponding initial group of data segments being similar to, but not identical to, the groups of data segments associated with the one of the plurality of deduplication modules.

14. The computer-implemented method of claim 13, wherein determining the feature value for each data segment of the second sequence of data segments is based on each result from applying a hash function to each data segment of the second sequence of data segments, and then selecting a series of bits from each result as each feature value.

15. The computer-implemented method of claim 13, wherein selecting the value from the feature values comprises identifying a mathematical relationship of the selected value to one of a maximal value and a minimal value of the feature values.

16. The computer-implemented method of claim 13, wherein determining the additional feature value for the at least one data segment of the second sequence of data segments is based on identifying a result from applying a hash function to the selected data segment and selecting a series of bits from the result, wherein the selected series of bits is mutually exclusive of any series of bits selected for any feature value.

17. The computer-implemented method of claim 13, wherein determining the additional feature value for the at least one data segment of the second sequence of data segments is based on each result from applying a hash function to each data segment of the second sequence of data segments, and selecting a series of bits from each result as each additional feature value, and wherein the similarity group identifier being based on one of the at least one additional feature value comprises identifying a mathematical relationship of the one of the at least one additional feature value to one of a maximal value and a minimal value of the at least one additional feature value.

* * * * *